United States Patent [19]

Ohnuki et al.

[11] Patent Number: 4,693,574
[45] Date of Patent: Sep. 15, 1987

[54] FILM INFORMATION READING DEVICE

[75] Inventors: Ichiro Ohnuki, Tokyo; Yoshihiko Aihara, Kanagawa; Yoichi Tosaka; Masaharu Eguchi, both of Tokyo, all of Japan

[73] Assignee: Canon Kabushiki Kaisha, Tokyo, Japan

[21] Appl. No.: 757,136

[22] Filed: Jul. 19, 1985

[30] Foreign Application Priority Data

Jul. 27, 1984 [JP] Japan .................................. 59-156552
Jul. 27, 1984 [JP] Japan .................................. 59-156555

[51] Int. Cl.[4] .............................................. G03B 7/24
[52] U.S. Cl. .................................. 354/21; 354/289.12
[58] Field of Search ....................... 354/21, 217, 289.1, 354/289.11, 289.12, 275; 352/78 C

[56] References Cited

U.S. PATENT DOCUMENTS

| 4,417,793 | 11/1983 | Oyokota et al. | 354/217 |
| 4,512,643 | 4/1985 | Tokuda | 354/21 |
| 4,582,408 | 4/1986 | Miki et al. | 354/21 |

*Primary Examiner*—L. T. Hix
*Assistant Examiner*—David M. Gray
*Attorney, Agent, or Firm*—Toren, McGeady & Associates

[57] ABSTRACT

In the disclosed camera, a reading device in the camera body's cartridge chamber reads electrically sensible data from a cartridge by determining the existence of data at one location of a data carrying surface on the cartridge and optically reading the remaining electrical data at the location of another data carrying surface. A positioning device positions a movable carrier member which holds optical detecting elements a specific distance form the other data carrying surface. Preferably the determination of the existence of data is performed by electrically contacting the one location of the data carrying surface.

28 Claims, 19 Drawing Figures

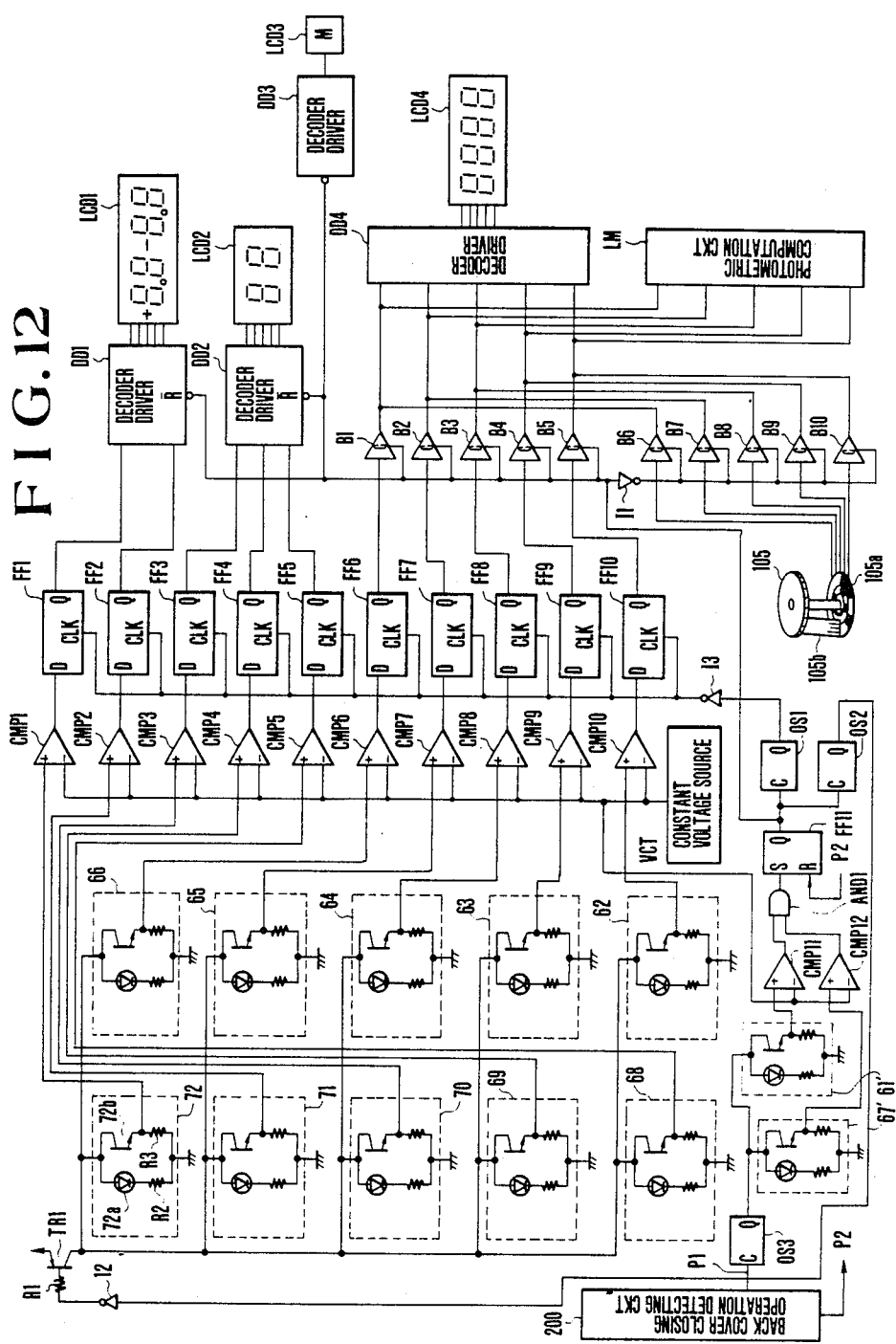

FILM INFORMATION READING DEVICE

BACKGROUND OF THE INVENTION

This invention relates to data reading device, particularly for optically reading a film information code on the outside surface of a film cartridge.

Proposals have been made for a film cartridge which indicates film data with a pattern formed by the presence and absence of electrically conductive parts. In addition to a conductivity reading, the pattern permits an optical readout on the basis of the differences in reflection factor between a conductive part and a non-conductive part. However, an optical reading film cartridge presents two problems.

The film information pattern is designed to be read by detecting its electrical conductivity. Hence detecting the film data solely in response to reflection factors of the conductive and non-conductive parts tends to result in detection errors because the system cannot discriminate between a cartridge without a data pattern and a cartridge with a data pattern.

A reading error might also be caused by deviation of the distance between the reflecting surface of a cartridge's pattern, and a sensor that detects the reflection factor of the film information code from an apposite range of distance values.

An object of the invention is to improve film data reading devices.

Another object of the invention is to avoid the aforementioned disadvantages.

Yet another object of the invention is to distinguish between cartridges without the film data codes and those carrying film information codes so as to eliminate errors arising from attempts to read cartridges without data codes.

Yet another object of the invention is to eliminate problems arising from inappropriate distances between sensing elements and data codes.

SUMMARY OF THE INVENTION

In accordance with a feature of the invention a first film data code detecting arrangement positioned within the cassette loading chamber serves to determine the electrical conductivity of a first detection surface on the film cartridge that carries data concerning the film contained in the cartridge, and a second film data code detecting arrangement located within the cassette loading chamber serves to detect the reflection factor of a second detection surface on the cassette.

According to another feature of the invention a positioning arrangement positions a member that holds the optical sensors at an appropriate distance from the cartridge.

According to another feature of the invention, the first detecting arrangement serves to sense whether or not the film cartridge loaded within the cartridge loading chamber is provided with a film information code, and the second detecting arrangement serves to detect at least information on the number of film frames from the film information code. This is accomplished as a result of the detecting surfaces, having a plurality of frames of information codes.

These and other features of the invention are pointed out in the claims. Other objects and advantages of the invention will become evident from the following detailed description when read in light of the accompanying drawings.

BRIEF DESCRIPTION OF THE DRAWINGS

FIG. 12 is a circuit diagram showing another circuit arrangement embodying this invention.

DESCRIPTION OF PREFERRED EMBODIMENTS

Figure 1:
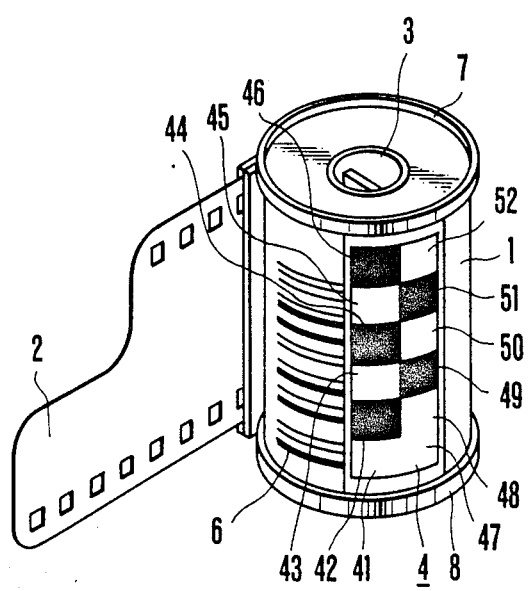
FIG. 1 is a perspective view showing an example of a cartridge usable with this invention.

The invention operates with a cartridge of the type shown in FIG. 1. Here, a cartridge body 1 contains film 2 wound on a take-up reel 3. The cartridge contains a 12-bit code pattern field 4 with twelve areas or portions or "patterns" 41 to 52 for coding film information. Each pattern is in the form of an electrode and is arranged to be read by the camera to determine whether or not it is electrically conductive.

The cartridge is also provided with an optically readable bar code 6 capable of being read on the basis of differences in the reflection factors between the background surface and the pattern surface. The bar code 6 is generally provided for commercial purposes or for developing photographs and usually not for taking photos.

Ferrules 7 and 8 on the cartridge carry the take-up shaft 3 and prevent the film within the cartridge from being exposed to light.

In the portions or patterns 41 to 52 of the field 4, the patterns 41 and 47 are ground patterns. Patterns 42 to 46 indicate film sensitivity and patterns 48 to 50 indicate a number of frames of film. The patterns 51 and 52 indicate allowable exposure latitude The ground patterns 41 and 47 indicate that the cartridge contains film information when both are conductive. However, for this purpose other cartridges having no film information must be non-conductive at parts corresponding to the patterns 41 and 47. Where a cartridge has film information such as in FIG. 1, the patterns 41 and 47 are always conductive. In FIG. 1, white patterns denote conductive portions and black patterns non-conductive portions.

Where the camera receives this cartridge and the film information is to be read from the cartridge, the camera is provided with contacts which are disposed in positions within a cartridge loading chamber of the camera and are arranged to correspond to the positions of the patterns 41 to 52 to have these contacts make contact with the patterns. In the cartridge 1 shown in FIG. 1, the camera must be provided with at least twelve contacts for reading all the information.

The camera according to the present invention reads out film information optically. While the patterns 41 to 52 are provided originally for detecting their electrical conductivity, the adjoining pattern, which can be read optically, is formed with a coding material of low reflection factor. On the other hand, among the patterns 41 to 52, the patterns 42, 44, 46, 49, and 51 which are non-conductive are also coded with a low reflection factor material of the same type as code the material of the bar code 6. Other patterns 41, 43, 45, 47, 48, 50, and 52, which are conductive patterns, have a high metallic glossy surface with a high reflection factor. The present invention utilizes the areas 41 to 52 for obtaining film information by reading or detecting the difference in the optical reflection factors.

The problems encountered by use of the cartridge 1 in a camera adapted to contact patterns 41 to 52 electrically, appear in FIGS. 2(a) to 2(d), 3(a) and 3(b). In general, the use of twelve electrically contacts pressing against the twelve patterns 41 to 52 on the surface of the cartridge 1 results in a considerable amount of contact pressure. Therefore, the cartridge tends to be dislocated by the contact pressure. If the camera contacts push the cartridge out it collides with the back cover of the camera when the latter is closed. This dislocates the film pull out slit on the cartridge. Hence, the film leader cannot be correctly positioned behind the aperature of the camera. The contact pressure also affects the film reel within the cartridge and the film winding shaft of the camera. Therefore, film winding and rewinding must occur under an unnecessary load.

On the other hand, when an attempt is made to read-out the electrical information optically, other problems arise. The reflection factor of the coating material generally applied to the outer circumferentional surface of a cartridge nearly equals that of the glossy surface of metal. Hence, it is impossible to differentiate between a cartridge 1 which carries the information field 4 shown in FIG. 1 from a cartridge without such an information field. In other words, where a cartridge which is not provided with information patterns is loaded in a camera, the parts corresponding to the pattern 41 and 47 also have a high reflection factor and mislead the sensors in the camera. As a result, the cartridge can be mistaken for a cartridge having information patterns and erroneous information is obtained by detecting the reflected light of parts corresponding to patterns 42 to 46 and 48 to 52.

A reflection detector, composed of a light emitting diode and a light sensor is normally used for detecting the reflection factor. With such a reflection detector there an optimum distance between the reflecting surface of an object to be detected and the light projecting and receiving surface of the detector. The output of the diode in the detector decreases if the distance value is either larger or smaller than the optimum value. Generally, the shape and dimensions of cartridges vary to a considerable degree. Moreover if the cartridge is improperly positioned within the cartridge loading chamber, the distance between the reflection detector and the patterned surface of the cartridge varies to a great extent and thus results in an inconsistent output.

Figure 2D:
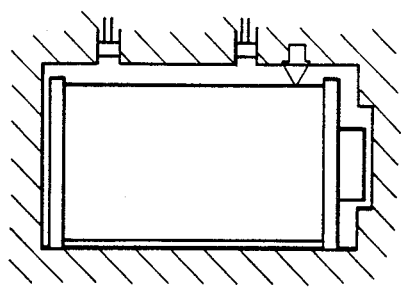
FIGS. 2A through 2D are sectional views showing the relative positions of conventional cartridge-loading chamber and the cartridge shown in FIG. 1.
Figure 2C:
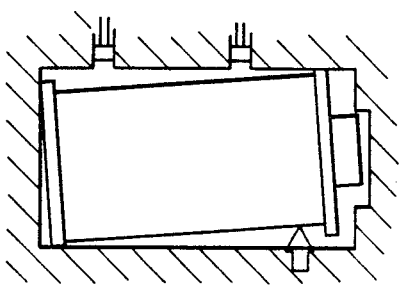
Figure 2B:
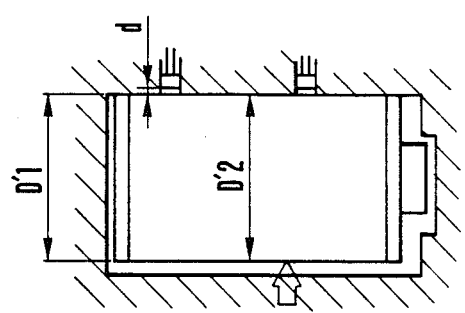
Figure 2A:
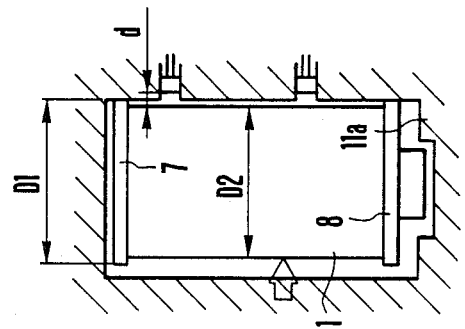

FIGS. 2(A) to 2(D) show the causes of the inconstancy of distance between the cartridge and the photo detectors. FIG. 2(A) illustrates a case where camera is loaded with a typical cartridge and a leaf spring or the like urges the cartridge in the direction of the arrow. Ferrules 7 and 8 abut an inner wall 11a of the cartridge loading chamber. The diameter D2 of the cartridge wall is a little less than the diameter D1 of the ferrule, and the reflection detector and cartridge are spaced a distance d from each other.

FIG. 2B shows another cartridge wherein the diameter D'1 of the ferrule is nearly equal to the diameter D'2 of the cartridge wall and the distance d between the cartridge and the detector is short. FIG. 2C shows a case were the urging force of the leaf spring is improperly applied to the cartridge and the latter is unevenly pushed to one side of the chamber. FIG. 2D illustrates a situation where a limited latitude allowed or designed in the camera body compels the loading chamber to push the cartridge against opposite side. In both FIGS. 2C and 2D, the distance d between the detector and the one end or whole side of the cartridge is much longer than in other cases.

Thus the distance between the cartridge and the reflection detectors change due to various factors. These variations of distance then affect the film information reading operation.

Figure 3A:
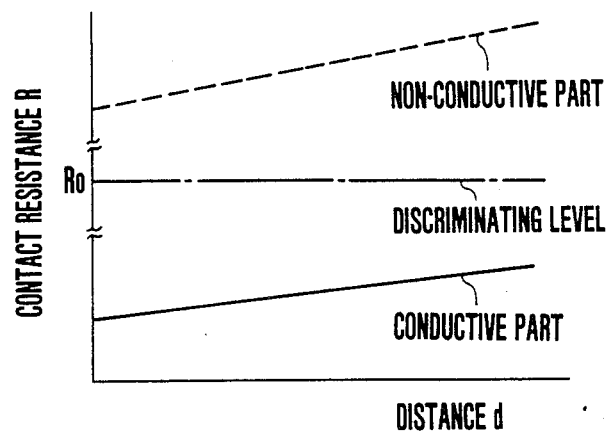
FIGS. 3A and 3B are graphs showing the characteristics of a film information code and a detection element in relation to the distance between them.
Figure 3B:
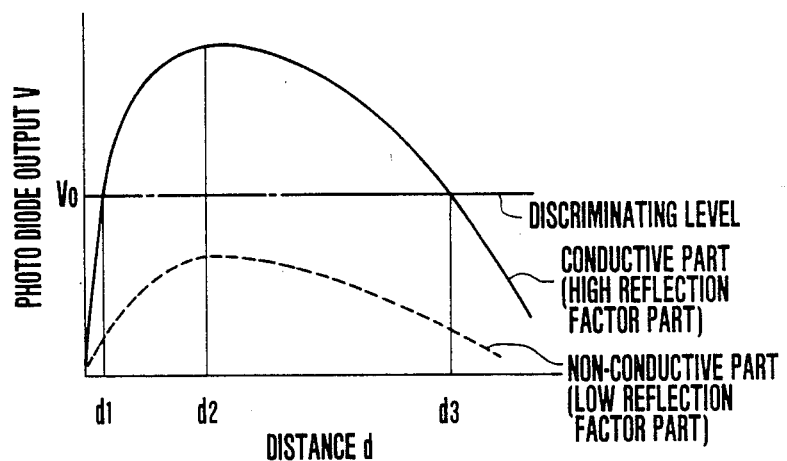

FIGS. 3A and 3B show how the characteristics of the contacts arranged to detect the electric conductivity and that of the reflection detectors arranged to detect the optical reflection factor affect the operation. In FIG. 3A, which shows the characteristics of the contact arrangement, the abscissa represents the distance between the patterned surface of the cartridge and a fixed point in the vicinity of each contact. The contact touches the cartridge with the urging force of an elastic member. Hence the distance between the contact and the cartridge remains zero even when the distance d varies. Accordingly, the origin of the abscissa represents a condition in which the cartridge is pushed against the inner wall of the cartridge loading chamber and the contact is in a maximum distorted state. Accordingly, in FIG. 3A, the contact pressure varies with the variation of the distance d. Then the contact resistance R changes as the contact pressure changes. The contact pressure increases and the resistance decreases as the distance d decreases. However, these variations can be reduced considerable by decreasing the spring contact of the spring which urges the contract.

The contact resistance of conductive part is normally between 10 miliohms and 10 Ohms depending on the contact pressure and the material of the contact while that of a non-conductive part is normally at least 1 megohm. There is a large difference between the contact resistance of a conductive pattern and a non-conductive pattern. Therefore, any reading error is unlikely to arise with a discrimination level set between them at a suitable value such as 10 kiloohms between the contact resistance of the conductive part and that of the non-conductive part.

Meanwhile, the characteristic of the reflection detector is that shown in FIG. 3B. The abscissa denotes the distance d between the light projecting and light receiving surfaces of the reflection detector and the reflection surface, or the outer circumferential surface of the cartridge, while the ordinate shows the output V of the reflection detector.

The outputs of both the conductive and non-conductive parts become maximum when the distance d is d2, and smaller when the distance is either longer or shorter than d2. Assuming that discrimination level is VO, the range of distances in which normal discrimination is possible is between the values d1 and d3. The conductive portion will be mistaken for a non-conductive part at any distances outside this range. Compared with the variations in the above contact resistance R, those of the output V are much larger. Furthermore, the distance between output level of the conductive part and that of the non-conductive part is small. Hence, it is necessary to keep the distance between the reflection detector and the cartridge varying for detecting the reflection factor.

In the embodiment shown in FIGS. 4 to 8, a camera body 11 forms a camera loading chamber 11a, an aperture 11b, an aperture 11c, inner rails 11d, and outer rails 11e. The body includes a film rewind shaft 12 which engages the film takeup reel 3, of the cartridge 1 for rewinding film. A cartridge retaining spring 13 prevents the cartridge from pulling out of position when the cartridge is loaded into the camera.

A film data reading device composed of members 61 to 72 includes contacts 61 and 67 located to detect the conductive state of patterns 41 and 47 on the cartridge 1 of FIG. 1 by contacting these patterns. A group of reflection type reflection detectors 62–66 and another group of reflection detectors 68–72 oppose corresponding groups of patterns 42–46 and 48–52. Detectors 62–66 and 68–72 are mounted in a holder 14 which is movable back and forth within a hole provided in the cassette loading chamber 11a. The projection 14a at the upper end of the holder protrudes to the same extent as the contacts 61 and 67. The projection 14a is arranged abut the side surface of the cartridge.

The reflection detectors 62–66 and 68–72 are identical with each other and details ascribed to an exemplary detector 72 is applicable to them all. In the detector 72 light from a light emitter (a light emitting diode) 72a is reflected by the pattern 52 of the cartridge 1 and received by a light sensor (a phototransistor) 72b. The intensity of the reflected light is high if the pattern 52 is conductive and is low if the pattern 52 is non-conductive. The discriminating level for reflected light intensity suitably set, the pattern can be optically read out.

Figure 4:
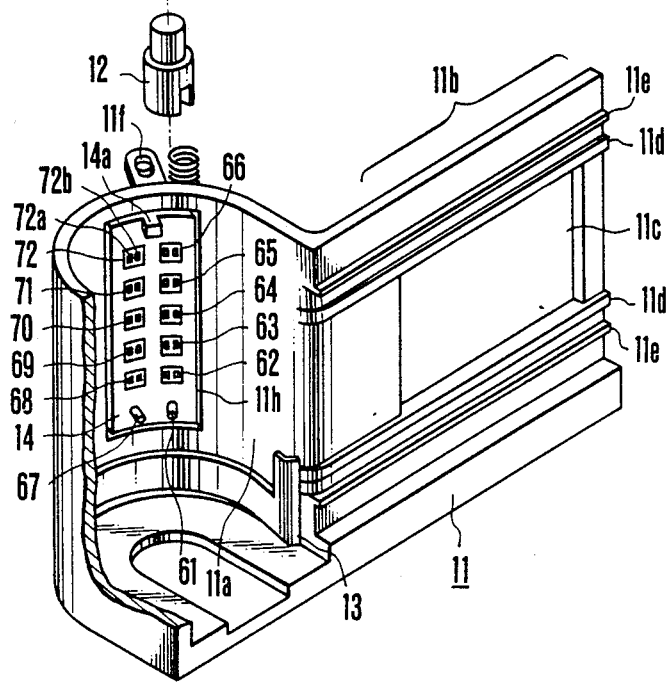
FIG. 4 is a perspective view showing essential parts of an embodiment of the invention.
Figure 5:
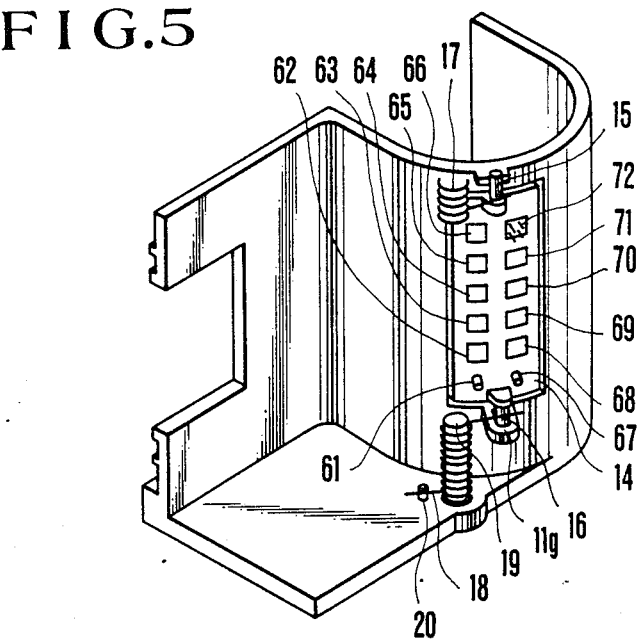
FIG. 5 is an perspective view showing the embodiment of FIG. 4 as viewed from the rear.

FIG. 5 shows a portion of the camera body of FIG. 4 viewed from the side of the cameras photo-taking lens. Here, shafts 15 and 16 on the upper and lower ends of the holder 14 fittingly engage slots 11f (see FIG. 4) and 11g which are formed in camera body 11. This arrangement permits the entire holder 14 to move toward the inside and outside of the cartridge loading chamber 11a. Springs 17 and 18 apply biasing forces to the holder 14 to move it toward the inside of the chamber 11a. The spring 18 is wound around the shaft 19 and terminates with one arm attached to a pin 20 while its other end is attached to the shaft 16. The other spring 17 is arranged in the same manner. However, parts corresponding to the shaft 19 and the pin 20 are omitted from the illustration. Each of the reflection detectors 62–66 and 68–72 includes terminals as shown at the detectors 72 and FIG. 5. These terminals are soldered to a flexible printed circuit board 21 which is shown in FIG. 6A and 6B.

Figure 6A:
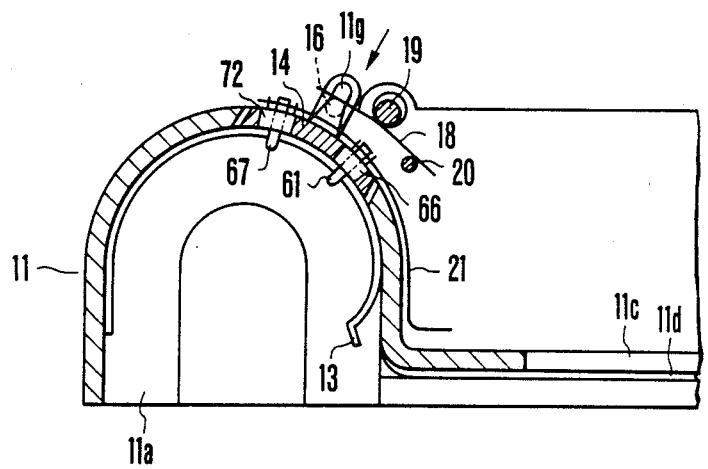
FIGS. 6A and 6B are sectional views of the embodiment of FIG. 4.
Figure 6B:
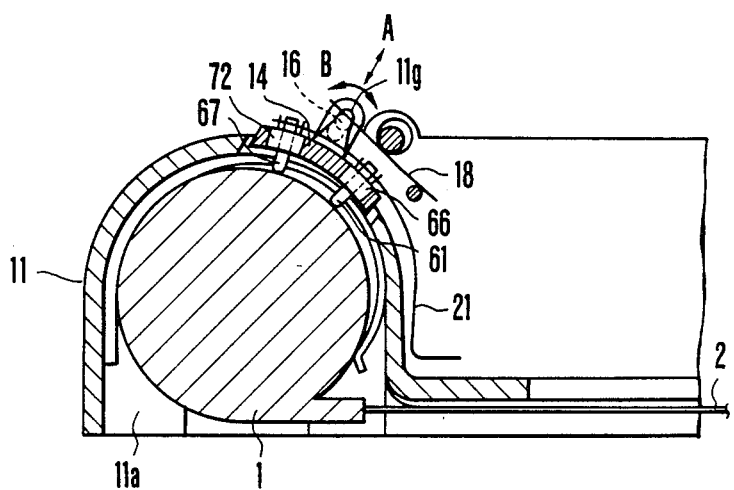

FIG. 6A shows the embodiment of the invention without a cartridge loaded therein, while FIG. 6B shows it with a cartridge loaded therein. Both FIGS. 6A and 6B are sectional views showing the essential parts of the embodiment. In FIG. 6A, the springs 18 and 17 (not shown) push the shafts 16 and 15 (not shown) against the ends of the slots 11g and 11f (not shown) in the direction of the arrow. In this condition, the contacts 61 and 67 protrude to the inside of the cartridge loading chamber 11a. This protrusion of the contacts 61 and 67 is arranged to be sufficient to have the contacts 61 and 67 unfailingly contact any cartridge of the smallest conceivable diameter. In this condition, when the camera is loaded with the cartridge 1 by pushing away the foremost end of the cartridge retaining spring 13, the arrangement reaches the position shown in FIG. 6B. The spring 13 then retains the cartridge within the cartridge loading chamber 11a. The outer circumferential surface of the cartridge 1 pushed the contact 61 and 67 and the holder 14 is retracted to the position shown in FIG. 6B.

The shaft 16 becomes movable in the directions of the bidirectional arrow A and in the turning directions of the arrow B relative to the slot 11g. Therefore, movement along a combination of these two movable directions allows correction for any difference in diameter of the cartridge and any inadequate cartridge positioning within the loading chamber such as the conditions shown in FIG. 2b and 2d. The correction permits the contact 61 and 67 appositely to contact the outer circumferential surface of the cartridge. Hence, the reflection detectors 62–66 and 68–72 can be maintained at a correct distance from the patterns 42–46 and 48–52 which are formed on the outer circumferential surface of the cartridge. It goes without saying that the distance between the detectors 62–66 and 68–72 on the one hand and the patterns 42–46 and 48–52 on the other, is defined by a set-back difference of the light projecting and receiving surfaces of the detectors from the fore ends of the contacts 61 and 67.

The movement of the shaft 15 in the direction of the arrow A relative to the slot 11g and that of the other shaft 15 in the direction of the arrow A relative to the slot 11f are independent of each other. This permits adequate correction of the positioning shown in FIG. 2c. Furthermore, although the projection 14a of the holder 14 is not shown in the FIGS. 6A and 6B, the spring 17, of course causes the projection 14a to abut the circumferential surface of the cartridge. The projection 14a protrudes to the same extent as the contacts 61 and 67. This arrangement keeps all reflection detectors 62–66 and 68–72 at equal distances from the circumferential surface of the cartridge.

The force of the push of the spring 18 corresponds to the contact pressure of the contact 61 and 67 and the spring force of the spring 18 must be arranged to achieve the normal conductive condition with that force. However, the spring 17 may be arranged to apply just enough force to press the projection 14a of the holder 14 against the circumferential surface of the cartridge with absolute reliability. The cartridge retaining spring 13 is arranged to apply a spring force just sufficient to prevent the cartridge from being pushed out by the forces of the springs 17 and 18. Compared to the conventional arrangements for reading the twelve patterns 41–52 with all the contacts corresponding to them, the spring pressure required for the spring 13 can be permitted to be much lower than that required just to counteract the pressure of the two contacts 61 and 67 and that of the one projection 14a. Therefore, the spring 13 never places any impediment on loading and unloading of the cartridge.

Figure 8:
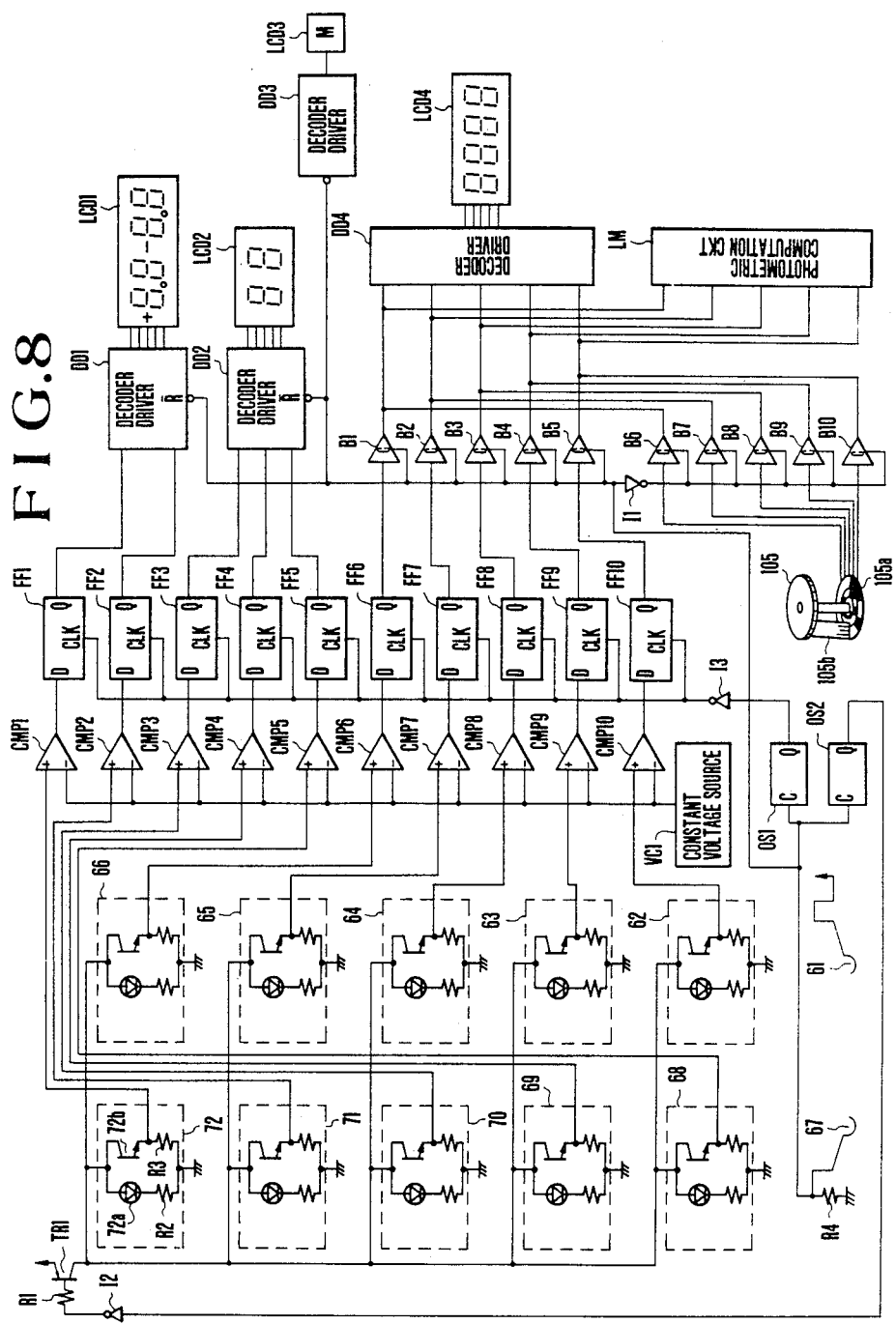
FIG. 8 is a circuit diagram showing a circuit embodying this invention.

In FIGS. 6A and 6B a flexible printed circuit board 21 is used for connecting the contacts 61 and 67 carried by the holder 14 to the reflection detectors 62-66 and 68-72. FIG. 8 illustrates the circuit on the flexible printed circuit board 21.

Figure 7:
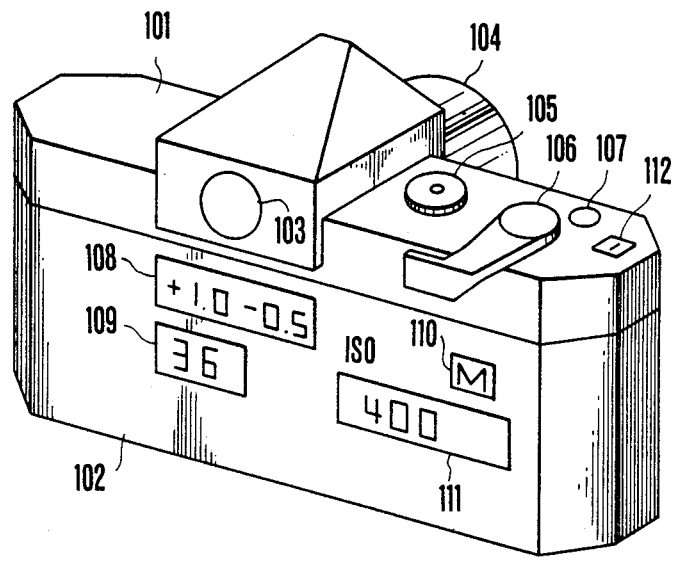
FIG. 7 is a perspective view showing a camera embodying the invention.

FIG. 7 illustrates a camera embodying the invention and containing the film information readout device described. The camera includes an upper lid 101, a back cover 102, a view finder window 103, a photo taking lens 104, a film sensitivity information input dial 105, a film winding lever 106, and a shutter release button 107.

The back of the camera carries a film latitude display window 108 and a film frame number display window 109. A warning display window 110 (hereinafter referred to as an M display window) on the back of the camera displays a warning when a cartridge having no information code is loaded into the cartridge loading chamber. A film sensitivity display window 111 on the back of the camera displays film sensitivity and a window 112 displays the number of pictures taken.

In FIG. 7, when the camera is loaded with a cartridge having an information code, the camera according to the invention operates as follows.

The camera reads the information code with the cartridge when loaded therein. Then the readout data are displayed in the film latitude display window 108, the film frame number display window 109, and the film sensitivity display window 111.

In this condition, when the photographer pushes the release button 107, the camera measures external light with a photometric circuit which is not shown, and which controls a shutter speed and aperture value for an apposite exposure according to the film sensitivity value displayed at the film sensitivity display window 111. In this case, because the film sensitivity information read out from the information code on the cartridge 1 takes priority over the film sensitivity information input dial 105, the value displayed at film sensitivity window 111 remains unchanged even when the dial 105 is operated to supply a different film sensitivity data value.

When the photographer wishes to note the remaining number of film frames during the process of photography, he can immediately find that number by comparing the values displayed at the photographed picture display window 112 with that of the film frame number display window 109. In the event that it becomes necessary for the photographer to have information concerning film latitude under difficult photo-taking conditions, such as a back- lighted shot, the information is obtainable from the film latitude display window 108.

When the cartridge is provided with no information code, the camera operates as follows:

Because information on the film latitude and on the number of frames is not available, display windows 108 and 109 remain blank. Meanwhile, information concerning the film sensitivity, which is indispensable for photography, is obtainable from the input dial 105 and displayed at the film sensitivity display window 111.

When the release button 107 is pushed, the camera performs the same photometric operation on the external light with its photometric circuit, which is not shown, and control the shutter and diaphragm for an apposite exposure according to the film sensitivity value set by the film sensitivity information input dial 105. However, in this case, the warning display window or M display window displays and "M" to warn the photographer that the film sensitivity information is obtained from the input dial 105.

FIG. 8 shows an example of the electric circuit of the camera embodying the invention and containing the film information reading device. In FIG. 8, the circuit includes the reflection detectors 62-66 and 68-72 and the contacts 61 and 67 which are arranged to serve as a conductivity detection switch, shown in FIG. 4. The following describes the internal circuit arrangement of the detector 72. Those of other detectors 62-71 are identical with the arrangement of detector 72. In the detector 72, a phototransistor or sensor 72b detects reflected light resulting from light emitted from the light emitting diode 72a. The sensor 72b produces a photo current in proportion to the quantity of light received. A resistor R2 is connected to the light emitting diode 72a and is arranged to control the current value for the diode 72a. Another resistor R3 is connected to the photo sensor 72b to convert the photo current flowing from the photo sensor 72b into a voltage. As mentioned above, the reflection detectors 62-71 are arranged to have the same internal circuit as the internal circuit arrangement of the detector 72 described above.

A resistor R4 connects the conductivity detecting contact 67 and ground. The other contact 61 connects to a power source. When the cartridge which is provided with the information code is loaded, the contacts 61 and 67 are short-circuited to cause the contact 67 to produce a high level signal. Conversely, when a cartridge which has no information code is loaded or when no cartridge is loaded, the contact 67 produces a low level signal. A constant voltage source VC1 produces a constant voltage. Comparators CMP1-CMP10 receive the constant voltage of the constant voltage source VC1 at their inverting input terminals. The output of the reflection detector 72 is applied to the non-inverting input terminal of the comparator CMP1. The output of the reflection detector 71 appears at the non-inverting input terminal of the comparator CMP2. In the same manner, the output of the reflection detector 70 is applied to the non-inverting input terminal of the comparator CMP3; the output of the detector 69 to the non-inverting terminal of the comparator CMP4; the output of the detector 68 to the non-inverting input terminal of the comparator CMP5; the output of the detector 66 to the non-inverting input terminal of the comparator CMP6; the output of the detector 65 to the non-inverting input terminal of the comparator CMP7; that of the detector 64 to the non-inverting input terminal of the comparator CMP8; that of the detector 63 to the non-inverting input terminal of the comparator CMP9; and that of the detector 62 to the non-inverting input terminal of the comparator CMP10.

When a rising signal which changes from low to high is applied to the C-input terminal, or terminal C, of each of two monostable multivibrators OS1 and OS2, their Q-output terminals produce pulse signals which remains high for a predetermined period of time. Further, a signal from the contact 67 is applied to the C-input terminal of each of the monostable multivibrators OS1 and OS2. D type flip-flops (also referred to as FF's) FF1-FF10 respond to a rising signal which changes from low to high applied to their input terminals CLK they latch signals supplied to the D-input terminals and reduce them at their Q-outputs.

The outputs of the comparators CMP1 to CMP10 are applied to the D-input terminals of the respective D flip-flops FF1 to FF10. That is, the output of the comparator CMP1 is applied to the D-input terminal of the D flip-flop FF1, the output of the comparator CMP2 to the D-input of the D flip-flop FF2, etc. An inverter I3 applies the output at the terminal Q of the oscillator OS1 to the terminal CLK of each D flip-flops FF1 to FF10. Tri-state buffers B1 to B10 exhibit a high impedance when they receive a low level input at their respective terminals C, and operate as ordinary buffers when the terminals C receive high level signals. The switch or contact 67 applies the signals produced there to the terminals C of each of the buffers B1 to B5. An inverter I1 applies the signal produced by the switch or contact 67 to the other buffers B6 to B10. As a dial 105, also shown in FIG. 7, is operated, a brush 105b produces electrical ON and OFF signals as it turns and slides over a pattern electrode 105a, which supplies film information on the basis of the electrical ON and OFF states of the pattern.

The output of the D flip-flop FF6 passes to the input terminal of the buffer B1, that of the D flip-flop FF7 to the input terminal of the buffer B2, the flip-flop FF8 to the buffer B3, that of the flip-flop FF9 to the buffer B4, and that of the D flip-flop FF10 to the input terminal of the buffer B5. The film information input dial 105 applies a high or low signal from the pattern electrodes 105a and the brush 105b to the buffers B6 to B10.

An external display device LCD1, for example of the liquid crystal type, displays the film latitude at the film latitude display window 108 shown in FIG. 7. Another external display device LCD2 displays the number of frames of film at the film frame number display window 109 of FIG. 7. A warning or M external display device LCD3 and a film sensitivity external display device LCD4 indicate their data at the respective M display window 110 and the film sensitivity display window 111 of FIG. 7.

A decoder driver DD1 drives the external display device LCD1 in response to signals from the D flip-flops FF1 and FF2. A decoder driver DD2 drives the external device LCD2 in response to signals from the D flip-flops FF3 to FF5. Input terminals $\overline{R}$ in the decoder drivers DD1 and DD2 causes the external display devices LCD1 and LCD2 to display a blank (no display) when the terminals $\overline{R}$ receive low signals from the contact 67. Another decoder driver DD3 drives the external display device LCD3 in response to the signal from contact 67 and causes the device LCD3 to display an M when the input signal applied thereto is low. A further decoder driver DD4 receives either signals produced by the buffers B1 to B5 or signals from the buffers B6 to B10 to drive the external display device LCD4 accordingly.

A PNP switching transistor TR1 selectively delivers or inhibits power to the reflecting-type photo diodes 62 to 64, and 68 to 72. The base of the transistor TR1 receives its control signal from the monostable multivibrator OS2 via an inverter I2 and a resistor R1.

In operation, when a switch (not shown) is turned ON, a power source in the form of a battery (not shown) energizes the electric circuit shown in FIG. 8. If the camera receives a cartridge 1 with information code, the contact 61 and 67 contact the conductive patterns 41 and 47, and are thus short-circuited. The level of the signal produced by the contact 67 in FIG. 4 now changes from low to high. This high signal appears at the monostable multivibrators OS1 and OS2 which in turn produce pulse signals both of which remain high for predetermined periods of time. For example, the pulse signal from the multivibrator OS1 may be arranged to stay high for 100 milliseconds and that of the multivibrator OS2 to stay for 200 milliseconds. An inverter I2 reverses the high level pulse signal from the multivibrator OS2 and applies a low signal to the PNP transistor TR1 via the resistor R1. This turns the transistor TR1 on and supplies power to the reflecting type photo diodes 62 to 66, and 68 to 72. A reading operation on the information code of the cartridge 1 now starts.

The reading operation of the reflection detector 72 is taken as an example of the operation of other diodes. The light-emitting detector 72a of the diode 72 emits light. The light is reflected by the pattern 52 and arrives at the light sensor 72b. This incident light causes the light receiving sensor 72b to produce a photo current proportional to the quantity of the reflected or incident light. Therefore, a high reflection factor in the film information code generates a larger photo current than a low reflection factor. A resistor R3 converts the current into a voltage value which is high when a large current flows. Other reflection detector 62 to 66, and 68 to 71 operate in the same manner as the photodiode 72.

Comparators CMP1 to CMP10 compare the voltage obtained from the respective detection photo currents with a constant voltage VC1 at each of the comparators. As a result of the comparison, the comparator produces either a high level signal or low level signal. Upon elapse of 100 milliseconds after commencement of power to the reflecting-type photo detector, the monostable multivibrator OS1 goes low. The inverter I3 inverts the signal and applies it to the inputs CLK of each of the D flip-flops FF1 to FF10 as a rising signal which changes from low to high. Each of the D flip-flops FF1 to FF10 then latches the signal applied to its input terminal D and furnishes the signal from its output terminal Q. In other words, the flip-flop FF1 and FF10 store and hold the information coded in the patterns 42 to 46, and 48 to 52 of the cartridge 1.

For another 100 milliseconds, the monostable vibrator OS2 continues to produce a high signal. Once a total of 200 milliseconds have elapsed, the monostable multivibrator OS2 stops producing a high signal and goes low. The inverter I2 inverts the low signal from the monostable multivibrator OS2 into a high which the resistor R1 applies to the base of the PNP transistor TR1. This turns off transistor TR1 and cuts off power to the reflection detector 62 to 66, and 68 to 72. The light-emitting diode 62a to 66a and 68a to 72a then stop emitting light.

The D flip-flops FF1 to FF10 thus store the information of the information code on the cartridge 1 through the operation of this circuit as described. More specifically, the flip-flops FF1 and FF2 store film latitude information, and the flip-flops FF3, FF4 and FF5 store data concerning the number of film frames. The decoder driver DD1 receives the high signal from the contact 67 at its reset input terminal $\overline{R}$. Hence, the decoder driver DD1 decodes the signals produced at the flip-flops FF1 and FF2 and drives the external display device LCD1 so it indicates the latitude of the film on the basis of the drive signal, for example, a latitude "+1.0–0.5". Similarly, since the contact 67 applies a high signal to the reset input terminal $\overline{R}$ of the driver DD2, the latter decodes the signals from the flip-flops FF3 to FF5 and drives the external display device LCD2 so that the latter manifests a number of film frames, for example, "36" on the basis of the drive signal applied from the driver DD2 to the display device LCD2. Since the high signal from the contact 67 is also applied to another decoder driver DD3, the latter does not drive the external display device and allows the latter to remain blank.

Buffers B1 to B5 receive the high signal from the contact 67 at their input terminal C while the inverter I1 inverts the high signal from the contact 67 and applies a low to the input terminals C of the other buffers B6 to B10. Accordingly, buffers B6 to B10 produce high impedance outputs while the buffers B1 to B5 operate as ordinary buffers. Therefore, data produced from the buffers B1 to B5 are supplied to the decoder driver DD4 and the photometric computation circuit LM. However the buffers B6 to B10 do not pass the signals from the dial 105 to the driver DD4 and computation circuit LM. The buffers B1 to B5 are for the signals produced by the D flip-flops FF6 to FF10. Of the information codes on the cartridge 1, the flip-flops FF6 to FF10 store information concerning the film sensitivity. Therefore, the decoder driver DD4 and the photometric computation circuit LM receive film sensitivity information read out of the information code on the cartridge 1. The decoder driver DD4 decodes this information and drives the external display device LCD4 to display the film sensitivity information such as "400" on the basis of the drive signal from the driver DD4.

The photometric computation circuit LM performs a photometric computing operating on the basis of film sensitivity information applied thereto. When a shutter release button 107 shown in FIG. 4 is pushed, the camera controls the shutter speed and aperture value according to the values TV and AV from the photometric computation circuit LM.

Where the camera receives a cartridge without the information code or the camera remains unloaded, the contacts 61 and 67 touch the insulated coded part of the cartridge or do not touch anything in the cartridge loading chamber. Hence, they are insulated from contact either by the coding of the cartridge or by the air with the chamber. Thus, contact 67 and the resistor R4 constantly produce a low output.

As a result, the rising signals which change from low to high do not pass to the input terminals C of the monostable multivibrators OS1 and OS2. Therefore, they continuously remain low. Accordingly, the reflection diodes 62 to 66, and 68 to 72 never receive power. Moreover, because the low from the contact 67 appears at the reset input terminals $\overline{R}$ of the decoder drivers DD1 and DD2, the external display devices LCD1 and LCD2 are not driven and produce no display. The low signal from the contacts 67 causes the decoder driver DD3 to drive the external display LCD3 to evidence "M".

Furthermore, the low signal from the contact 67 at the input terminals C of th buffers B1 to B5 creates a high impedance at the buffers B1 to B5 while the inverter I1 makes the buffers B6 to B10 operate as ordinary buffers. Accordingly, buffers B6 to B10 apply the high or low signals which the brush 105b produces from the electrode 105a of the film information input dial 105 to the decoder driver DD4 and the photometric computation circuit LM. Hence, the decoder driver DD4 and the photometric computation circuit LM receive the film sensitivity information set by the film information input dial 105.

The buffers B1 to B5 do not transmit the information applied to them because of the low appearing at their respective input terminal C. This is similar to the earlier condition when the signal from the contact 67 was high and the inverter I1 delivered low signals to the input terminals C of the buffers B6 to B10 and at that time, when the buffers B1 to B5 were transmitting signals, prevented the buffers B6 to B10 from delivering signals.

The rest of the operation is similar to that in which the camera is loaded with a cartridge carrying a data code. The decoder driver DD4 decodes the aforementioned stated information and drives the external display device LCD4 to show the film sensitivity information on the basis of the drive signal of the decoder driver DD4. The photometric computation circuit LM computes values TV and AV representing shutter and aperture values on the basis of the film sensitivity information received.

When the release button 107 of FIG. 7 is pushed, the camera controls an exposure on the basis of the values TV and AV furnished by the photometric computation circuit LM. However, in this case the exposure would be wrong if the film sensitivity information value set by the dial 105 differed from the actual film sensitivity value. Nevertheless, the external display device LCD3 expresses the value "M" which urges the photographer to review and correct the set value.

Figure 9:
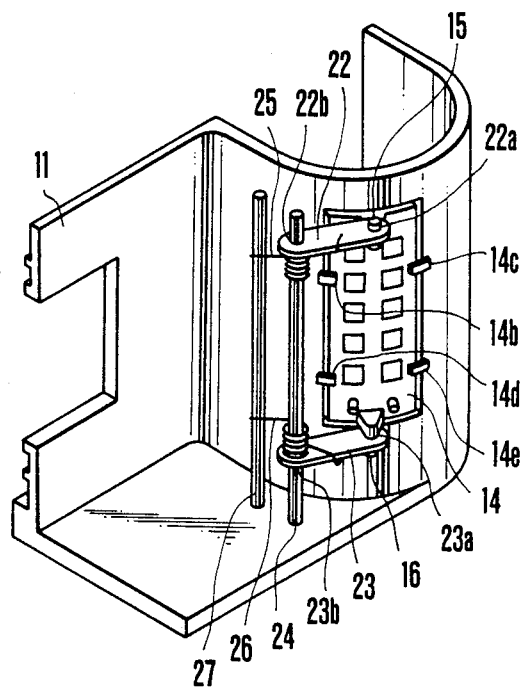
FIG. 9 is a perspective view showing the essential parts of another embodiment of the invention.
Figure 10A:
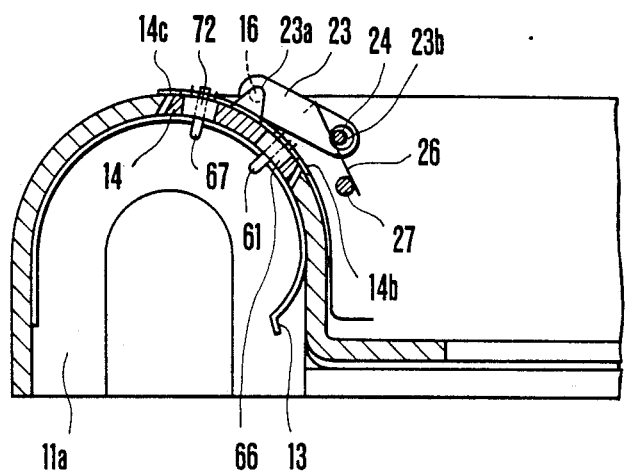
FIGS. 10A and 10B are sectional views of the embodiment in FIG. 9.
Figure 10B:
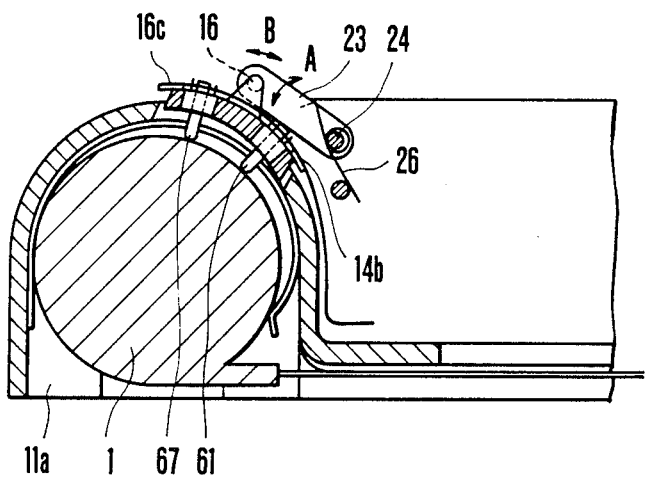

FIGS. 9, 10a and 10b disclose another embodiment of the invention. In the preceeding example, the holder 14 is arranged to move back and forth through the upper and lower slots 11f and 11g. In this embodiment, the two upper and lower intermediate levers make the holder swingable. In FIG. 9, the holder 14 is arranged in the same manner as in the preceeding embodiment and includes reflection detectors 62–66 and 68–72 and contacts 61–67. Shafts 15 and 16 support the holder 14. The present embodiment includes intermediate levers 22 and 23 on a carrying shaft 24 mounted on the camera body 11. The lever 22 rotatably carries the shaft 15 by virtue of a hole 22a at one end of the intermediate lever 22, while the other end of the lever is pivotally carried by the carrying shaft 24 through another hole 22b. Intermediate lever 22 is thus turnable on the carrying or support shaft 24. The other intermediate lever 23 is likewise arranged to carry the shaft 16 and be carried by the shaft 24. Thus the shafts 15, 16, and 24 all rotate relative to the levers 22 and 23. One end of a coil spring 25 surrounding the shaft 24 engages the intermediate lever 22 and the other end engages a spring shaft 27 so as to urge the intermediate lever 22 counterclockwise. Another coil spring 26 about the shaft 24 also urges the intermediate lever 23 counterclockwise and has one end engaging the intermediate lever 23 and the other end engaging the spring shaft 27.

These intermediate levers 22 and 23 being urged counterclockwise bias the holder 14 toward the inside of the cartridge loading chamber 11a. Stoppers 14b, 14c, 14d, and 14e are formed integrally with the holder 14 and define the movable limit of the holder toward the cartridge, or in the counterclockwise direction as viewed in FIG. 9.

In FIG. 10A the holder 14 is urged toward the inside of the cartridge loading chamber 11a and restricted from further movement by the stoppers 14b and 14c. In FIG. 8b, the cartridge 1 is set in position. The turning movement of the intermediate lever 23 in the direction of the arrow A and that of the holder 14 in the direction of the arrow B causes the contacts 61 and 67 and the projection 14a of FIG. 1 to abut the cartridge 1. This keeps the reflection detectors 62–66 and 68–72 at a distance from the patterns 42–46 and 48–52 of the cartridge 1.

The turning movements of the intermediate lever 22 and the other lever 23 in the direction of the arrow A are independent of each other. Therefore, even improper positioning of the cartridge as shown in FIG. 2c can be corrected in the same manner as in the first embodiment.

Figure 11:
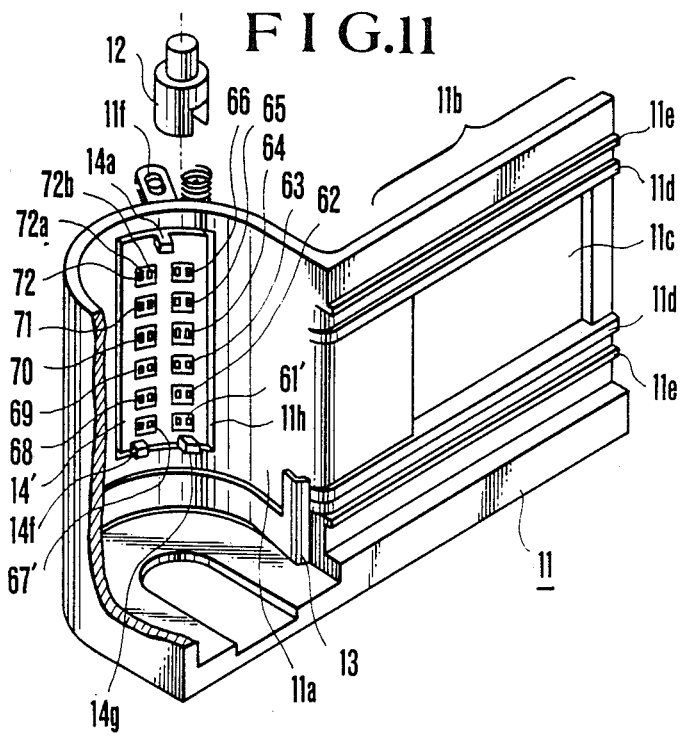
FIG. 11 is a perspective view of the essential parts of another embodiment of this invention.

Yet another embodiment of the invention is shown in FIGS. 11 and 12. Here, the holder 14' is arranged differently from the previous embodiments. Each of the patterns 41–52 are arranged to be read out optically. In the preceding example the contact 61 and 67 are formed on the holder 14 in positions corresponding to the respective patterns 41 and 47. In the present embodiment, these positions are occupied by reflection detectors 61' and 67'. Accordingly, detection of the film information of the cartridge 1 is totally optical.

In FIG. 11, the holder 14' includes two projections 14f and 14g of the same length as the projection 14a. The patterns 41–52 of the cartridge 1 are displaced from the reflection detectors 62–66 and 68–72, 61', and 67' a predetermined distance by means of projections 14a, 14f, and 14g which are located to contact the outer circumferential surface of the cartridge at three points.

The reflection detectors 61' and 67' are similar to the other reflection detectors 62–66 and 68–72 in that they have the same construction as the detector 72. The outputs of the detectors 61' and 67' are applied to the non-inverting input terminals of the respective comparators CMP11 and CMP12. A constant voltage produced by the voltage source VC1 is applied to the inverting input terminals of the comparators CMP11 and CMP12. The input terminals of the reflection detectors 61' and 67' connect to an output P1 of a back cover closing operation detection circuit 200 through a monostable multivibrator OS3 which performs in the same manner as the monostable multivibrators OS1 and OS2. The detecting circuit includes a switch which responds to the closing of the camera's back cover 102. When the back cover is closed, the detecting circuit 200 changes the output P1 from low to high and changes an output P2 from high to low. Accordingly, closing the back cover of the camera causes the monostable multivibrator OS3 to go high for a predetermined length of time and supply current to the reflection detectors 61' and 67'. The latter apply a high voltage to the respective comparators CMP11 and CMP12 only when the camera is loaded with a cartridge having a film information code, i.e., a cartridge having patterns 41 and 47 of a high reflection factor as shown in FIG. 1. Therefore, both comparators CMP11 and CMP12 produce high outputs to make the output of an AND gate AND1 high. Hence the output Q of the latching set-reset flip flop FF11 swings high to operate the monostable multivibrators OS1 and OS2. The output P2 of the detecting circuit 200 which goes high when the back cover opens resets the flip flop FF11 swings high to operate the monostable multivibrators OS1 and OS2.

With the exception of the aforementioned points, the rest of this embodiment is arranged in the same manner as the previous embodiments and its parts are indicated by the same reference numerals.

Figure 13:
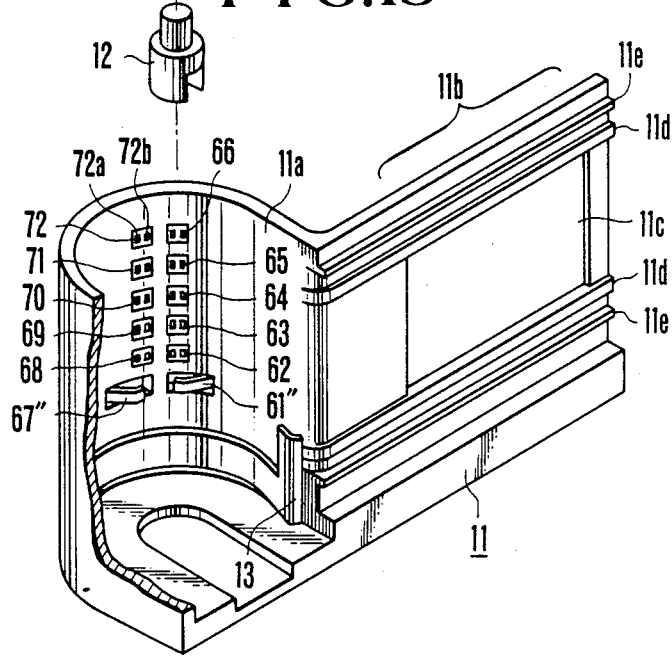
FIG. 13 is a perspective view of the essential parts of still another embodiment of this invention.

Yet another embodiment of the invention appears in FIG. 13. Unlike the previous embodiments, the reflection detectors 62–66 and 68–72 are buried directly on the inner wall of the cartridge loading chamber 11a. The contact 61" and 67" are also secured directly in the wall. The contact 61" and 67" are in the form of leaf springs so that minor variations in the dimensions of the cartridge can be absorbed by deformation of the leaf spring like contacts.

This embodiment makes it impossible to attain the common feature of the previous embodiments in that the distance from the patterns 41–52 of the cartridge 1 to the reflection detectors 62–66 and 68–72 is always kept appropriate. However, the ability to determine whether the cartridge is provided with film information can be obtained in the same manner as in the other embodiments. With the exception of this point, this embodiment operates in the same manner as the previous embodiments, and this embodiment uses members with the same reference numerals as the previous embodiments. Accordingly, further details of this embodiment are omitted from the description.

The invention provides first film information code detecting or reading means which determine the electrical conductivity of the sensing surface of the cartridge, and second film information detecting means which detect the reflection factor of the detection surface of the cartridge. Compared with conventional film data code detecting systems which sense film data codes solely by detecting electrical conductivity, the combined arrangement of first and second detecting means solves the problem arising when the cartridge deviates from its proper set position within the cartridge loading chamber due to excess contact pressure. Moreover, compared with conventional optical methods for detecting film information solely by detecting reflection factors, the invention solves the problem of erroneous detection of a cartridge having no film information code thereon. Another advantage of the invention resides in the fact that the distance between the film cartridge and the number of detecting elements of the film information code detector that detects the reflection factor of the sensing surface of the cartridge can be correctly set. This avoids problems of erroneous detection or reading.

The invention overcomes the problems associated with prior art cameras which use as many as twelve contacts to read the information on the cartridge shown in FIG. 1. The present invention eliminates the need for the considerable amount of pressure that twelve contacts tend to produce and avoid the dislocation by contact pressure. Devices of the present invention are thus not burdened by incorrectly positioned cartridges which displace the film behind the aperture of the camera and place pressure on the film rewind shaft that adds to the load of the winding and rewinding of the film.

While embodiments of the invention have been described in detail, it will be evident to those skilled in the art that the invention may be embodied otherwise without departing from its spirit and scope.

What is claimed is:

1. A reading device for reading information on the surface of a film cartridge, comprising:
   first film information code detecting means for determining a condition of a first detecting surface of the film cartridge;
   second film information code detecting means for detecting the reflection factor of a second detecting surface of said cartridge, the information on the surface of the film cartridge including at least information concerning the number of frames of the film and the film sensitivity, said detecting surfaces having a plurality of trains of information codes, and said information codes being formed in plurality trains of patterns in the axial direction of the cartridge, the second film information code detecting means being arranged in a plurality of trains corresponding to the plurality of trains of information codes; and said first detecting means including detection contact pins which are arranged to come into contact with said first detecting surface of the film cartridge, said contact pins contacting an area about two times the information code area of said second detecting surface, and detecting conductivity and con-conductivity between the contact pins.

2. A device as in claim 1, wherein said second detecting means includes a plurality of pairs of light emitting elements and light receiving elements and is arranged to emit light from said light emitting elements to the surface of said film cartridge and to have the light reflected by the surface and to have reflected light detected by said receiving means, a pair of light emitting element and light receiving element being arranged for one code area.

3. A device as in claim 1, wherein said first detecting means includes sensing means for sensing the surface of a cartridge and for determining whether the film cartridge in the loading chamber carries in information code.

4. A device as in claim 3, wherein said sensing means senses the surface of the cartridge optically.

5. A device as in claim 1, further comprising electronic-optical display means for displaying film information by one of said first detecting means and said second detecting means.

6. A device as in claim 5, wherein said display means includes a discriminating display portion for showing whether the cartridge is provided with film information.

7. A reading device for reading information on the surface of a film cartridge, comprising:
   means forming a cartridge loading chamber;
   film information code detecting means for detecting the reflection factor of a detection surface of the film cartridge, said detecting means including a plurality of optical detecting elements;
   a carrying member arranged to carry the plurality of optical detecting elements of said detecting means, said carrying member being movably attached to said cartridge loading chamber; and
   positioning means for determining the position of said carrying member so that said plurality of optical detecting elements are positioned at a predetermined distance from the circumferential surface of said film cartridge.

8. A device as in claim 7, wherein said positioning means is arranged to position said carrying member such that all of said plurality of optical detecting elements are positioned at equal distances from the circumferential surface of said film cartridge.

9. A device as in claim 7, wherein said positioning means includes a spring member to urge said carrying member to move toward said film cartridge; and
   a contact part arranged to come into contact with the film cartridge to determine the distance between said carrying member and the circumferential surface of the film cartridge.

10. A device as in claim 8, wherein said positioning means includes a spring member to urge said carrying member to move toward said film cartridge; and
   a contact part arranged to come into contact with the film cartridge to determine the distance between said carrying member and the circumferential surface of the film cartridge.

11. A device as in claim 7, wherein said detecting means includes a plurality of pairs of light emitting elements and light receiving elements and is arranged to emit light from said light emitting elements to the surface of the film cartridge to have the light reflected by the surface and to have reflected light detected by said light receiving elements.

12. A device as in claim 11, wherein said positioning means is arranged to position said carrying member such that all of said plurality of optical detecting elements are positioned at equal distances from the circumferential surface of said film cartridge.

13. A device as in claim 11, wherein said positioning means includes a spring member to urge said carrying member to move toward said film cartridge; and
   a contact part arranged to come into contact with the film cartridge to determine the distance between said carrying member and the circumferential surface of the film cartridge.

14. A device as in claim 7, wherein said detecting means is arranged to detect whether said film cartridge is provided with a film information code.

15. A device as in claim 7, wherein the cartridge contains information concerning the number of film frames therein on the detection surface, and said detecting means includes means for sensing the number of film frames.

16. A device as in claim 7, further comprising electronic-optical display means for displaying film information obtained by said detecting means.

17. A device as in claim 16, wherein said display means includes a discriminating display portion for showing whether the cartridge is provided with film information.

18. A reading device for reading information on the surface of a film cartridge, comprising:
   means forming a cartridge loading chamber;
   first film information code detecting means including detecting contacts for determining the electrical conductivity of a first detection surface of a film cartridge having the film information;
   second film information code detecting means for determining the reflection factor of a second detection surface bearing the information on the cartridge, said second film information code detecting means including a plurality of optical elements;
   a carrying member arranged to carry said detecting contacts and said optical detecting elements, said carrying member being movably attached to said cartridge loading chamber means; and
   said detecting contacts being arranged to protrude a predetermined distance from said carrying member such that, with the circumferential surface of said film cartridge brought into contact with said detecting contacts, said optical detecting elements carried by said carrying members are positioned a predetermined distance from the circumferential surface of said film cartridge.

19. A camera as in claim 5, wherein said body includes a back, and said back includes electro optical display means for displaying film information obtained either by said first detecting means or said second detecting means.

20. A camera as in claim 19, wherein said display means includes a discriminating display portion for showing whether the cartridge is provided with film information.

21. A camera, comprising:
a camera body forming a cartridge loading chamber for receiving a cartridge having information on the surface of the cartridge;
film information code detecting means for detecting the reflection factor of a detection surface of the film cartridge, said detection means including a plurality of optical detecting elements;
a carrying member arranged to carry the plurality of optical detecting elements of said detecting means, said carrying member being movably attached to said cartridge loading chamber means; and
positioning means for determining the position of said carrying members so said plurality of optical detecting elements are positioned at a predetermined distance from the circumferential surface of said film cartridge.

22. A device as in claim 21, wherein said positioning means are arranged to position said carrying member such that all of said plurality of optical detecting means are positioned at equal distances from said circumferential surface of the film cartridge.

23. A device as in claim 21, wherein said positioning means includes a spring member to urge said carrying member to move toward said film cartridge; and
a contact part arranged to come into contact with the film cartridge to determine the distance between said carrying member and the circumferential surface of the film cartridge.

24. A device as in claim 21, wherein said detecting means includes a plurality of pairs of light emitting elements and light receiving elements and is arranged to emit light from said light emitting elements to the surface of the film cartridge to have the light reflected by the surface and to have reflected light detected by said light receiving elements.

25. A camera as in claim 21, wherein said detecting means is arranged to detect whether said film cartridge is provided with a film information code.

26. A device as in claim 21, wherein the cartridge contains information concerning the number of film frames therein on the detection surface, and said detecting means includes means for sensing the number of film frames.

27. A device as in claim 21, further comprising electronic-optical display means for displaying film information obtained by said detecting means.

28. A device as in claim 27, wherein said display means includes a discriminating display portion for showing whether the cartridge is provided with film information.

* * * * *